Figure 2:
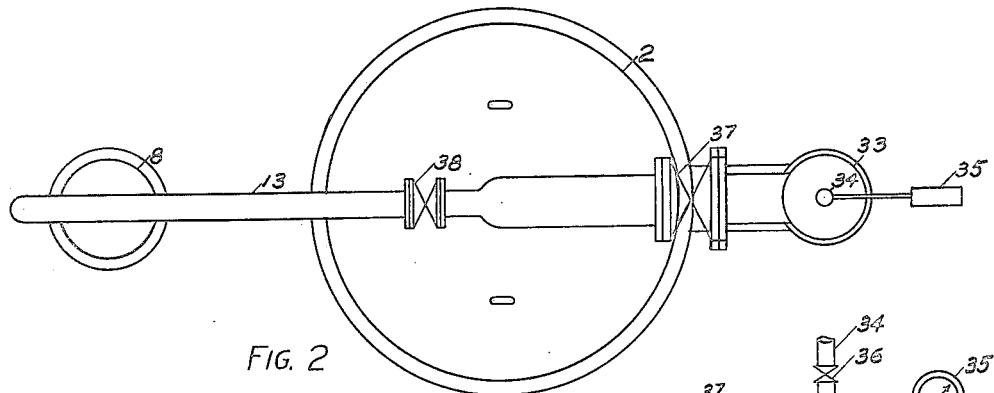

W. L. DE BAUFRE.
EVAPORATOR.
APPLICATION FILED NOV. 23, 1915.

1,213,596.

Patented Jan. 23, 1917.
3 SHEETS—SHEET 1.

Inventor
William L. De Baufre
BY
William W. Varney
Attorney

Witnesses
Frank Clarke
John A. Richardson

SECTION ON AB

SECTION ON CD

UNITED STATES PATENT OFFICE.

WILLIAM L. DE BAUFRE, OF ANNAPOLIS, MARYLAND.

EVAPORATOR.

1,213,596.   Specification of Letters Patent.   Patented Jan. 23, 1917.

Application filed November 23, 1915. Serial No. 62,952.

*To all whom it may concern:*

Be it known that I, WILLIAM L. DE BAUFRE, a citizen of the United States, residing at Annapolis, in the county of Anne Arundel, in the State of Maryland, have invented a certain new and useful Evaporator, of which the following is a specification.

My invention relates to improvements in evaporators, and has for its object an improved means of compressing the vapor produced and the use of the compressed vapor to evaporate the solution.

A further object of my invention is the providing in an evaporator means of compressing the vapor produced and the use of the compressed vapor to evaporate the solution and auxiliary means of condensing noncompressed vapor from the evaporator.

A further object of my invention is the providing in an evaporator improved means of cleaning the same.

A further object of my invention is the providing in an evaporator improved means of drying the vapor.

A further object of my invention is the providing in an evaporator of means of controlling the circulation of the solution.

A further object of my invention is the providing of means to increase the efficiency and the capacity and to decrease the weight of evaporators.

A further object of my invention is the providing of an evaporator of improved durability and cleanliness.

With the foregoing and other objects in view my invention consists of the novel construction, combination and arrangement of parts as hereinafter specifically described and illustrated in the drawings, wherein is shown the preferred embodiment of my invention, but it is understood, that changes, variations and modifications can be resorted to which come within the scope of the claims hereunto appended.

Figure 1:
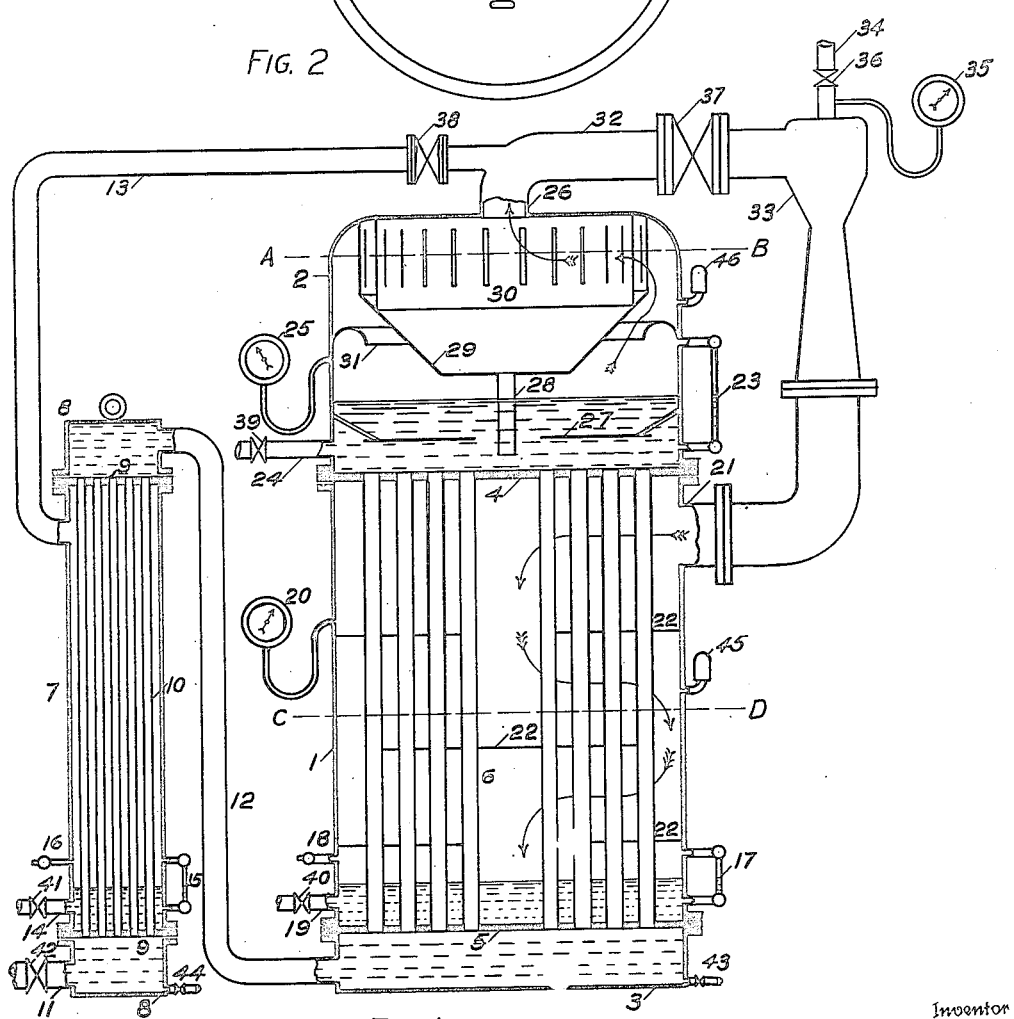
Figure 3:
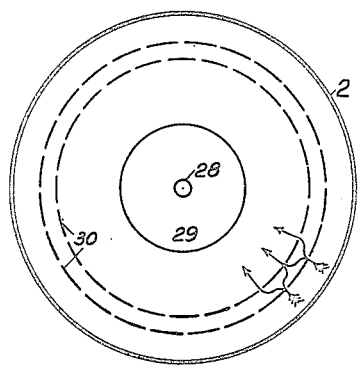
Figure 5:
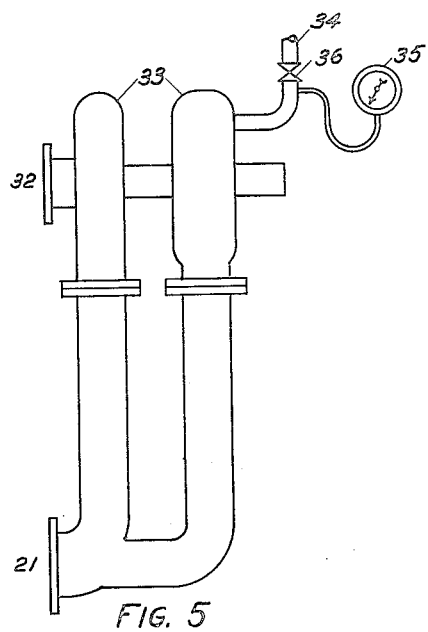
Figure 4:
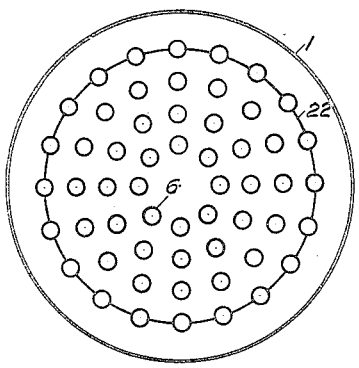
Figure 6:
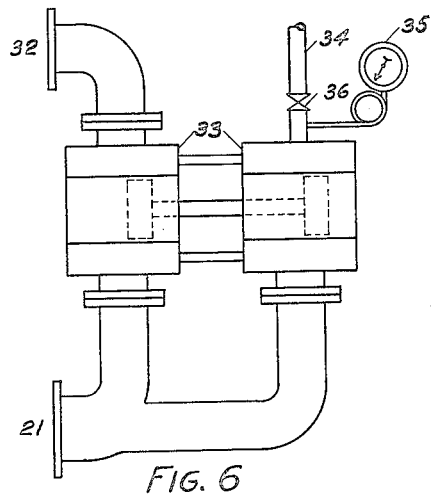
Figure 7:
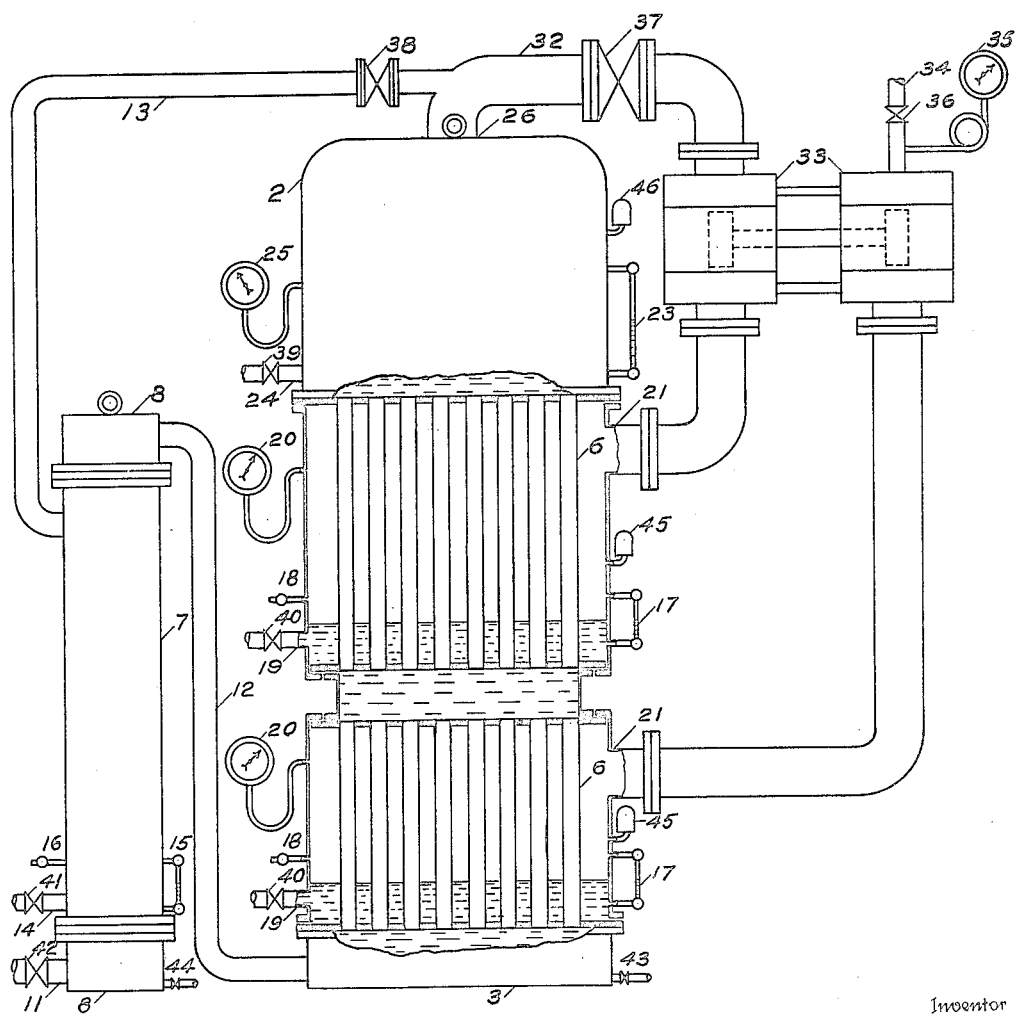

In the drawings of the herein described embodiment of my invention, Figure 1 shows a view in elevation, partly in section, of my improved evaporator as operated by a vapor ejector; Fig. 2 is a plan view of the evaporator shown in Fig. 1; Fig. 3 is a sectional view taken through "A B" of Fig. 1; Fig. 4 is a sectional view taken through "C D" of Fig. 1; Fig. 5 is a view in elevation of a rotary compressor, vapor actuated; Fig. 6 is a view in elevation of a horizontal reciprocating vapor actuated compressor; and Fig. 7 shows a view in elevation of my improved evaporator wherein the compressed vapor from the solution is kept separate and condensed in a different compartment than that in which the vapor from the exhaust of the compressor is condensed.

Similar numerals refer to similar parts throughout the several views.

The evaporator consists of, shell 1, separator head 2 and water bottom 3. The upper tube sheet 4 is placed between the shell 1 and the separator head 2; and the lower tube sheet 5 is placed between the shell 1 and the water bottom 3. Evaporator tubes 6 extend between the tube sheets 4 and 5. The evaporator tubes 6 may be either straight or slightly curved to allow for expansion, and may be cast, welded, rolled or otherwise fastened in the tube sheets 4 and 5. A preheater may also be attached as shown in Fig. 1. This preheater will have a shell 7, water heads 8, tube sheets 9, and preheater tubes 10.

The solution feed enters the preheater at pipe 11 with control valve 42, flows through preheater tubes 10 and from thence passes to the water bottom 3 through connecting pipe 12. Vapor from the separator head 2, is supplied the preheater through vapor pipe 13 having valve 38 therein. The condensed vapor or condensate is drained from the preheater through pipe 14 with control valve 41. A gage glass 15 is provided to show the condensate level within the preheater shell, and an air relief cock 16 is attached to the shell 7 just above the condensate level.

In the evaporator shell 1 is a gage glass 17 to show the level of the condensate therein. An air relief cock 18 is provided just above the water level. The condensate is drained through pipe 19 with control valve 40. The pressure of the vapor within the shell is shown on pressure gage 20. Vapor, usually steam, enters the shell at 21 and is caused to pass over and among the evaporator tubes 6 by the baffles 22, of which there may be any number.

On the separator head 2 there is provided a gage glass 23 to note the level of the solution therein. Pipe 24 with control valve 39 is provided for the discharge of the solution. Pressure gage 25 indicates the pressure within the separator head of the vapor arising from the solution. The vapor is carried off through outlet 26, either to the compressor through vapor pipe 32 with valve 37 therein, or to the preheater through vapor pipe 13.

Within the separator head is suspended a baffle or baffles 27 over the ends of the evaporator tubes 6, in order to prevent the boiling solution from these tubes being projected above the surface of the solution. Return pipe 28 projects downward from separator pan 29, and the separator grids 30 extend from the circumference of pan 29 to the top of the separator head and are secured thereto. The grids 30, as shown in Fig. 3, consist of a plurality of concentric drums containing vertical narrow slits or other openings. These openings are staggered in the several drums. A splash guard 31 extends around the circumference of the separator head.

A compressor 33 compresses the vapor from the separator head 2 and discharges it into the shell 1. This compressor may be of the jet type as shown in Fig. 1, of the rotary type as shown in Fig. 5, or of the reciprocating type as shown in Fig. 6. The steam or other operating fluid to operate the compressor is supplied through pipe 34 with throttle valve 36, the pressure of the fluid being indicated on pressure gage 35. Solution drain valves 43 and 44 are provided on the evaporator and preheater respectively. A pressure relief valve 45 is attached to shell 1 to prevent it being subjected to an excessive pressure in starting the compressor 33. A pressure relief valve 46 may also be provided on the separator head.

The evaporator may be square, rectangular, oval, or have any convenient section other than the circular section shown in the figures.

The operation of my invention is as follows: The solution, such as a salt brine, is fed through the pipe 11 and control valve 42 to the preheater 7. Flowing through tubes 10 it passes thence through the connecting pipe 12 to the water bottom 3, and then flows through the evaporator tubes 6 to the separator head 2. In passing through the preheater 7, the solution is heated nearly to the boiling point. In the evaporator bottom 3 and the lower ends of the evaporator tubes 6, it is further heated; and as it passes upward through the evaporator tubes 6, it boils. The mass of liquid and vapor is projected against the baffle 27, which prevents a column of liquid being projected into the vapor space. The separator pan 29 deflects the vapor toward the circumference of the separator head 2. The vapor must then pass through comparatively narrow slits or other openings in the separator grids 30, also seen in Fig. 3, the object of these grids being to separate the vapor into narrow streams, and to deflect each stream so that the moisture will be separated from it. The great number of these openings which can be provided by this construction accomplishes the desired purpose of separating the moisture without causing an appreciable drop in pressure. The separated moisture runs down the pan 29 to the return pipe 28 which extends below the liquid surface in order to provide a seal to prevent vapor passing into the space above pan 29 without passing through the grids 30. If this evaporator is used on board ship, the splashing of the brine up the sides of the separator head is prevented by the circular splash guard 31. The location of the return pipe 28 near the middle of the evaporator insures that it will project under the surface of the solution in this contingency. The solution which is not evaporated, is discharged through the pipe 24 with control valve 39. A constant flow of the solution will be maintained in this evaporator in ordinary operation, with the result that the concentration will not be sufficient to produce much deposit of scale on the heating surface. Should these surfaces be incrusted with scale, however, they can be comparatively easily cleaned by removing the separator head and using a tube cleaner, since the scale will be on the inside of the tubes. Also, the definite flow of the solution through the tubes results in improved heat transmission through the heating surface of the tubes by reason of the flow of the solution over the heating surface. The level of the solution is noted by means of the gage glass 23 on the separator head; and the pressure of the vapor within is indicated on the pressure gage 25. The vapor is discharged through the vapor outlet 26.

With valve 37 open, the vapor is withdrawn by whatever form of compressor is provided—this may be a jet compressor as shown in Fig. 1, a rotary compressor as shown in Fig. 5, or a reciprocating compressor as shown in Fig. 6. In any case the vapor is compressed to a higher pressure than that in the separator head and is generally mixed with the exhaust steam or other vapor which has been used to produce the compression. In the rotary and reciprocating types of compressors, the compressed vapor and the exhaust steam are not necessarily mixed, but may be condensed in separate parts of the evaporator as indicated in Fig. 7. The steam or other operating fluid from some external source is supplied through pipe 34 and throttle valve 36. It should be noted that some medium other than steam can be used to operate the compressor. The compressed vapor, generally mixed with steam, passes into the evaporator shell through vapor inlet 21. This vapor passes around the evaporator tubes 6, the baffles 22 being so arranged as to cause the steam to pass across the tubes as many times as may be desired. The tubes are so arranged in the tube heads 4 and 5, see Figs. 1 and 4, as to cause, with the baffling arrangement shown, the vapor to pass from circumference to center and then from center to circumference of the shell. The pressure of the vapor in the shell is indicated on pressure gage 20. The condensed vapor, or condensate, is drained through pipe 19 and control valve 40. The condensate, collecting in this manner at the point where the coolest solution enters the evaporator, is cooled somewhat before it is drained. The air and other non-condensable gases in the vapor condensed, will collect just over the condensate, and these gases are allowed to escape by partly opening the air relief cock 18. The height of the condensate is shown on gage glass 17. By opening valve 38, part of the vapor produced in the separator head passes over to the preheater, 7. Here it is condensed, and the somewhat cooled condensate is drained out through pipe 14 by operating valve 41. This preheater provides condensed vapor or condensate not contaminated with any impurities that may be in the steam or other fluid used in the compressor operated as indicated in Figs. 1, 2, 5 and 6. For example, if sea water is the solution and the fluid used for compression is steam from a boiler, the condensate in the evaporator shell may be rendered unfit for drinking purposes by oil or other vapors in the steam. The preheater then provides drinking water from drain pipe 14 while the condensate from drain pipe 19 is used for other purposes. If the exhaust steam is separated from the compressed vapor as shown in Fig. 7, no contamination results. The condensation of non-compressed vapor in the preheater gives an additional quantity of fresh water per pound of steam or other fluid used in the compressor.

The condensate from the preheater shell will probably be sufficiently cooled therein so that it will not vaporize to any great extent if run into an open tank. The condensate from the evaporator shell, however, will probably be discharged at a high temperature. The heat corresponding to the high temperature may be saved by discharging this condensate into the boiler feed tank (on shipboard) not shown; or the condensate may be cooled in a special cooler, or it may be discharged into the preheater, if desired. In special cases separate coolers or separate preheaters may be required for the condensates from both evaporator shell and the preheater shell. Both the evaporator and preheater shells may be automatically drained by traps. Also the solution discharged from pipe 24 may be cooled in a preheater or cooler.

The relative proportions of the various parts of this apparatus will depend upon the desired relation between efficiency, capacity and weight; and, for any particular design, there are certain shell and vapor pressures which should be carried. Assuming these to be known, the operation of the apparatus will be as follows: Assume all valves closed. The solution feed valve 42 is first opened and the evaporator filled to the proper level with solution as indicated on gage glass 23. Then solution feed valve 42 is closed. The condensate control valve 40 should be slightly opened to prevent accumulation of condensate. Then throttle valve 36 is opened until the proper pressure is indicated on gage 35 to operate compressor 33, but pressure gage 20 should be watched to see that the shell is not subjected to an excessive pressure should pressure relief valve 45 fail to operate. When gage 25 begins to indicate some pressure, vapor valve 37 may be opened wide. The pressure shown by gage 25 will continue to increase and the water level in glass 23 will drop. Solution feed valve 42 should now be opened slightly and solution discharge valve 39 cracked. Vapor valve 38 may be opened wide, and condensate valve 41 adjusted to keep the preheater drained. During the normal operation, the valves will be operated according to the indications on the several pressure gages and gage glasses. Throttle valve 36 will control the pressure indicated on gage 35 according to the desired operation of the compressor. Solution feed valve 42 will control the pressure indicated on gage 25. Solution discharge valve 39 will control the water level in gage glass 23. Both valves 42 and 39 must be operated in coördination to maintain the proper working conditions. Condensate drain valve 40 controls the water level in gage glass 17. Condensate drain valve 41 controls the water level in gage glass 15. The air relief cocks 16 and 18 will be opened to show a slight escape of vapor.

Having thus described my invention, what I claim and desire to secure by Letters Patent is—

1. An evaporator consisting of, means of containing a solution, means of compressing the vapor from said solution consisting of a vapor actuated compressor, means of heating said solution by said compressed vapor and the exhaust from said compressor and means of drying said vapor before being compressed.

2. An evaporator consisting of, means of containing a solution, means of compressing the vapor from said solution, means of heating said solution by means of said compressed vapor, and means of condensing non-compressed vapor from said solution.

3. An evaporator consisting of, means of containing a solution, means of compressing the vapor from said solution consisting of a vapor operated compressor, and means of combining compressed vapor from said compressor and the operating vapor to heat the solution.

4. An evaporator consisting of, means of containing a solution, means of compressing the vapor from said solution consisting of a vapor actuated compressor, and means of heating said solution by means of said compressed vapor and the exhaust from said compressor.

5. An evaporator consisting of, means of containing a solution, means of compressing the vapor from said solution consisting of a vapor actuated compressor, means of heating said solution by means of said compressed vapor and the exhaust from said compressor, and means of condensing non-compressed vapor from said solution.

6. An evaporator consisting of, means of containing a solution, means of compressing the vapor from said solution consisting of a vapor actuated compressor, means of heating said solution by said compressed vapor and the exhaust from said compressor and means of drying said vapor before being compressed and means of collecting the moistures from said drying means and returning it within the solution.

7. An evaporator consisting of, means of containing a solution, means of compressing the vapor from said solution consisting of a vapor actuated compressor, means of heating said solution by said compressed vapor and the exhaust from said compressor and means of drying said vapor before being compressed and means at the perimeter of said container for preventing the splash of said solution upon the displacement of said container.

8. In an evaporator, a solution container, means of compressing the vapor from said solution consisting of a jet compressor whereby a fluid operates on and commingles with the said vapor and means of heating the said solution by means of the said vapor and its commingled fluid.

9. An evaporator consisting of, means of containing a solution, means of compressing the vapor from said solution consisting of a vapor actuated compressor, means of heating said solution by means of said compressed vapor, means of heating said solution by means of the exhaust vapor from said compressor and means of keeping the said compressed vapor and exhaust vapor separate.

10. An evaporator consisting of means of containing a solution, means of compressing the vapor from said solution, means of heating said solution by means of said compressed vapor, and means of preheating said solution by non-compressed vapor from said solution.

11. An evaporator consisting of means of containing a solution, means of compressing the vapor from said solution, means of heating said solution by means of said compressed vapor, and means of preheating said solution by exhaust from said compressor.

WM. L. DE BAUFRE.

Witnesses:
THOMAS W. KINKAID,
H. A. STUART.